May 5, 1925.
W. C. KEYS
VEHICLE WHEEL RIM
Filed Sept. 20, 1919
1,536,503
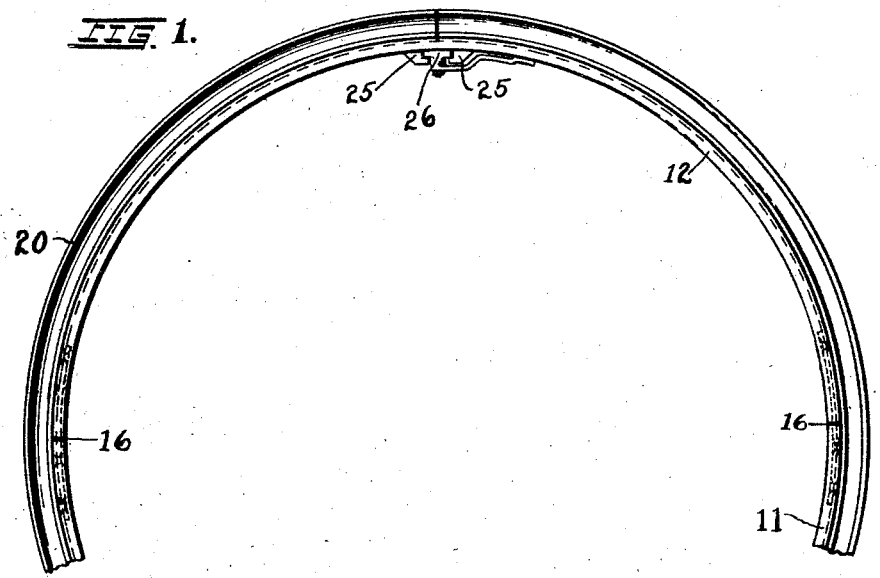
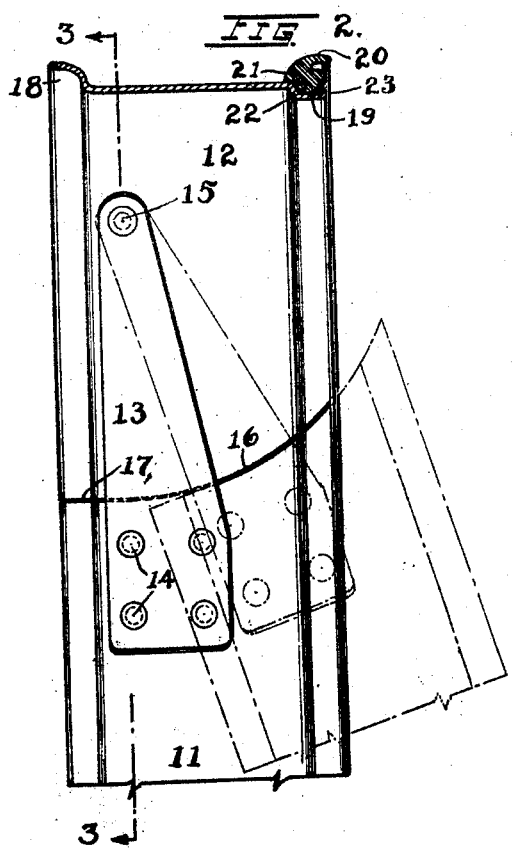
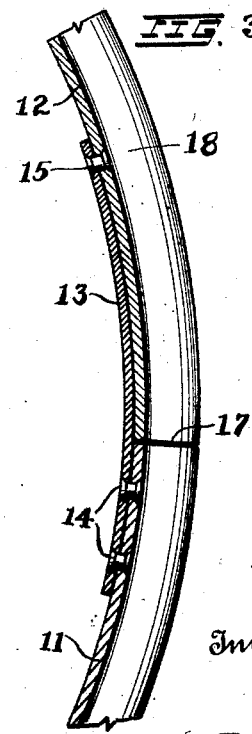
Inventor
WALTER C. KEYS.

Patented May 5, 1925.

1,536,503

UNITED STATES PATENT OFFICE.

WALTER C. KEYS, OF CLEVELAND, OHIO, ASSIGNOR, BY MESNE ASSIGNMENTS, TO JAMES H. WAGENHORST, OF JACKSON, MICHIGAN.

VEHICLE WHEEL RIM.

Application filed September 20, 1919. Serial No. 325,242.

*To all whom it may concern:*

Be it known that I, WALTER C. KEYS, a citizen of the United States, and a resident of Cleveland, county of Cuyahoga, State of Ohio, have invented certain new and useful Improvements in Vehicle Wheel Rims, of which the following is a specification.

This invention relates to vehicle wheel rims and more particularly to demountable rims composed of a plurality of complementary arcuate sections which can be moved relatively to such a position that they no longer lie in the same plane, thereby facilitating the removal of a tire from the rim or its replacement thereon. One of the objects of this invention is the provision of means for holding the sections of a rim of this type in the same plane, with their ends in alinement. Another object is the provision of means which will accomplish this result and will also serve to hold the tire in place upon the rim.

Other objects of the invention and the features of novelty will be apparent from the following specification when taken in connection with the accompanying drawings, in which:—

Figure 1 is a fragmentary side elevation of a rim embodying my invention;

Fig. 2 is a plan view of a part of the rim shown in Fig. 1, showing the manner in which the sections of the rim are hinged together; and Fig. 3 is a sectional view taken on the line 3—3 of Fig. 2.

In the drawings, I have illustrated a rim which is transplit at substantially diametrically opposite points to form two substantially semicircular arcuate sections 11 and 12. Hinge plates 13 are provided to underlie the ends of the sections 11 and 12, such plates being rigidly secured to the section 11 by rivets 14, or any other suitable means, and being pivotally secured to the section 12 by rivets 15 which pass through the hinge plates and the section 12 adjacent the one edge of the section. Each of the lines along which the rim is split is curved, the greater portion thereof being on an arc of a circle substantially concentric with the rivets 15, as shown at 16 in Fig. 2, so that the section 11 can be swung relatively to the section 12 to the position shown in dotted lines in the figure. A portion of each line of split is preferably straight, as indicated at 17, to form abutments which will limit the relative swinging motion of the sections 11 and 12 in one direction.

The rim is provided at one edge with an integrally formed tire-retaining flange 18, and adjacent its other edge, with a circumferential groove or channel 19 which is adapted to receive a side ring 20, which cooperates with the flange 18 to retain the tire upon the rim, each of the sections being formed with flange and channel portions which together form a continuous flange and a continuous channel when the sections are in the normal position shown in full lines in Fig. 2. The side ring 20 is provided with a base portion or web 21 which extends into the channel 19 and is held from movement laterally of the rim by the walls 22 and 23 thereof which are substantially perpendicular to the base of the rim. At one point in its circumference, the side ring 20 is transplit, and suitable locking means are provided to secure the ring in place upon the rim. For this purpose, I have shown the ring as having lugs 25 adjacent its ends, which lugs are adapted to extend through openings in the rim and be locked in seated position by the engagement of the pivoted locking member 26, but as the particular construction of such locking means constitutes no part of the present invention, a detailed description thereof is omitted, it being understood that any suitable means of securing the side ring in seated position may be employed.

Since the side ring 20 is in a single piece and its web 21 is securely seated in the channel 19 and extends across the joints between the sections 11 and 12, it will be evident that the engagement of the web 21 with the side walls 22 and 23 at the ends of the sections will prevent relative swinging motion of the sections. The danger of a collapse of the rim by an accidental blow thereon, during handling or while the rim is being carried as a "spare", is, therefore, avoided by the use of a side ring of this type, and the rigidity of the rim will be materially increased. In removing a tire from the rim, the side ring must be first removed from the rim and the rim then collapsed, by swinging the section 11 relatively to the section 12, and a slight relative movement of the sections will suffice to permit the removal of the tire, since the bead thereof need not be lifted over a flange.

While I have illustrated and described a preferred form of my invention, it will be understood that the invention is not limited to the specific structure described, and I, therefore, intend to cover all such constructions as come within the scope of the appended claims.

Having thus described my invention, what I claim is:

1. A vehicle wheel rim comprising a plurality of arcuate sections the ends of which are normally in abutting relation throughout their width, said sections being hinged together at points removed from their ends whereby they are capable of relative movement laterally of the plane of the rim and in such lateral movement the ends are relatively displaced laterally, and a one-piece detachable flange-ring on said rim adapted to normally hold said rim ends against relative movement.

2. A vehicle wheel rim comprising a plurality of arcuate sections grooved along one side and having their ends normally in abutting relation, hinges connecting said sections and whereby they are capable of relative movement laterally of the plane of the rim, and a one-piece flange-ring seated in said groove and bridging the joints between the ends of said sections and thereby normally holding said sections against relative movement.

3. A vehicle wheel rim comprising a plurality of arcuate sections grooved along one side and having their ends normally in abutting relation, hinges connecting said sections and whereby they are capable of relative movement laterally of the plane of the rim, and a one-piece flange-ring transversely split at one point in its circumference and seated in said groove and bridging the joints between the ends of said sections, the split in said flange-ring being spaced from the ends of said sections, whereby the flange-ring is adapted to normally hold said sections against relative movement.

4. A vehicle wheel rim comprising a plurality of arcuate sections grooved along one side and having their ends normally in abutting relation, hinges connecting said sections and whereby they are capable of relative movement laterally of the plane of the rim, and a one-piece flange-ring transversely split at one point in its circumference and seated in said groove and bridging the joints between the ends of said sections, the split in said flange-ring being spaced from the ends of said sections and the ends of the ring being detachably connected to one of said sections, the arrangement specified permitting said ring to hold said sections against relative movement.

5. A vehicle wheel rim comprising a pair of arcuate sections, the ends of which are normally in abutting relation throughout their width, hinge plates connected to the ends of one of the sections and extending beyond the splits between the sections and pivotally connected to the other section at points removed from the splits, the abutting ends being curved upon arcs struck from the pivots as centers whereby said ends are capable of relative movement laterally of the plane of the rim, and a one-piece detachable flange ring on said rim adapted to normally hold said rim ends against relative movement.

6. A vehicle wheel rim comprising a pair of arcuate sections grooved along one side and having their ends normally in abutting relation, hinge plates connected to the ends of one of the sections and extending beyond the splits between said sections and pivotally connected to the other section at points removed from the splits, the abutting ends of said sections being curved upon arcs struck from the pivots as centers whereby said sections are capable of relative movement laterally of the plane of the rim, and a one-piece flange ring transversely split at one point in its circumference and seated in said groove and bridging the joints between the ends of said sections, the split in said flange ring being spaced from the ends of said sections, whereby the flange ring is adapted to normally hold said sections against relative movement.

7. A vehicle wheel rim comprising a pair of arcuate sections grooved along one side and having their ends normally in abutting relation throughout their width, hinge plates connected to the ends of one of the sections and extending beyond the splits between the sections and pivotally connected to the other section at points removed from the splits, the abutting ends being curved upon arcs struck from the pivots as centers whereby said sections are capable of relative movement laterally of the plane of the rim, and a one-piece flange ring seated in said groove and bridging the joints between the ends of said sections and thereby normally holding said sections against relative movement.

In testimony whereof I affix my signature.

WALTER C. KEYS.